(12) United States Patent
Grace et al.

(10) Patent No.: US 6,426,077 B1
(45) Date of Patent: Jul. 30, 2002

(54) FOOD PRODUCT FOR HEALTH, NUTRITION AND WEIGHT MANAGEMENT

(75) Inventors: Margery Grace, New York; Rena Northrop, Putnam Valley; Joyce Kiley, Briarcliff, all of NY (US)

(73) Assignee: Indoor Tennis Consultants, Inc., Katonah, NY (US)

(*) Notice: Subject to any disclaimer, the term of this patent is extended or adjusted under 35 U.S.C. 154(b) by 0 days.

(21) Appl. No.: 09/632,401

(22) Filed: Aug. 4, 2000

(51) Int. Cl.⁷ .............................. A61K 9/00; A61K 9/14; A61K 9/50
(52) U.S. Cl. ........................ 424/400; 424/489; 424/499; 424/500
(58) Field of Search .................................. 424/400, 464, 424/465, 440, 490, 488, 466, 489, 725, 499, 500; 514/569, 599; 426/72, 548

(56) References Cited

U.S. PATENT DOCUMENTS 6,048,532 A     4/2000  Diaz et al. ................ 424/195.1
6,210,686 B1 *  4/2001  Bell et al. ................... 424/400

* cited by examiner

Primary Examiner—Thurman K. Page
Assistant Examiner—Blessing Fubara
(74) Attorney, Agent, or Firm—Milde & Hoffberg, LLP

(57) ABSTRACT

A wholesome food product with many uses, for weight control, health and nutrition.

25 Claims, No Drawings

FOOD PRODUCT FOR HEALTH, NUTRITION AND WEIGHT MANAGEMENT

FIELD OF THE INVENTION

The present invention relates to a wholesome food product and meal substitute, with a nutritional balance that makes it appropriate for weight maintenance or weight loss, and which provides a therapeutic benefit for medical/surgical patients.

BACKGROUND OF THE INVENTION

There are many commercially available weight loss, or diet, drinks. Products such as Slimfast™ and Nestle's Success™ claim to be low calorie, high energy, meal substitutes. In fact, diet drinks in this category range from about 200 calories to about 300 calories per serving, or meal. In addition, they contain a large amount of sugar, which with the milk solids are intended to provide the energy of a meal. SlimFast™ Strawberries and Cream, for example, has 220 calories, with 42 g. of carbohydrate, 37 g. of sugar, and 5 g. of fiber, in an 11-oz. serving. The theory behind these diet drinks is reduction in fat, control of serving size, and sense of fullness created by thickeners such as cellulose gums.

All these drinks are fortified; for example, the Slimfast™ Strawberries N' Cream is said to be fortified with 23 vitamins and minerals, but the approximately 22 g. of added sugar places a price on the nutrition.

Recent developments in the diet field indicate that the benefits of "low fat" diets have not been achieved by replacing fat calories with calories from simple sugars or refined carbohydrates. It is now concluded that the health benefits demonstrated by low fat diets were the result of substituting vegetable and fruit calories for fat calories. In addition, it appears that this misinterpretation of the "low fat" diet has lead to sharp increases in obesity and diabetes. The food products of the present invention do not have added sugar which address these issues.

Sugar in excess of immediate energy needs is disadvantageous to the body. Not only can it be deposited as fat in the body; it triggers insulin release, which has been shown to be associated with a generally lower immune response. In addition, recent research shows that women who have had breast cancer run an 8-fold increase in recurrence if they have high levels of blood sugar and insulin. It is believed that the insulin molecule, attaches to a receptor on the breast tissue cell wall, and converts the cell to a cancer cell.

At this time it is not known how many types of cell receptors can be activated by insulin, and how often the results are cancerous. What is known, is that simple sugars do not contain the macro and micro nutrients present in food, and cannot provide the health and immunity benefits of these nutrients.

Another type of meal substitute product is Carnation's Instant Breakfast™; a dry mix containing added sugar, which when added to milk to provide a vitamin fortified quick, breakfast meal substitute. Many of these diet drink/meal substitute product lines have complementary snack bar products. People using these products have met with mixed success in both losing weight and maintaining the weight loss.

Another line of diet/meal substitute drinks replaces fat with protein. These drinks may, or may not, contain carbohydrates in any substantial amount. The "Cambridge Diet" products are perhaps the best known in this category. More recently, the Atkins and Zone Diet theories have produced another round of diet drinks with higher protein and/or fat, but lower, or no, carbohydrates. Carbolite's soy shakes contain absolutely no carbohydrates; their only food source being protein. Again, people using these products are meeting with mixed success in both losing weight and maintaining the weight loss. In addition, many individual choose, or are advised, to limit their fat intake, and not all bodies digest protein easily.

The prior art diet/meal substitute drinks were often suggested as a nutritional addition or supplement to a regular diet. Newer commercial products, such as Ensure™, claim merely to be nutritional supplement to the daily diet, not a weight maintenance or weight loss product. However, their nutrition also comes at the expense of high levels of added sugar.

Nutritional additions to diet, such as Ensure™, and therapeutic meal substitutes, are also used in hospitals and other medical facilities as part of a program to maintain or increase the strength and health of patients. Nutritional meals for e.g. heart patients typically combine vitamin and/or mineral supplements with a high carbohydrate but low fat drink. Mead Johnson's proprietary drinks Ensure and Ensure Light, available to hospitals, have good protein levels, and the light contains little fat, but they both contain lots of added sugar. Other "nutritionals" include low sodium formulas, for heart patients, which contain substantial added sugar.

Another diet food product category is the low calorie snack. Alba™ Dietary Shake Mix provides a low calorie (non-fat) substitute for a milk shake, made by mixing a powdered mix with water, for a 70 calorie shake, or water and milk, for a 120 calorie shake. A comparison with non-fat powdered milk shows that some of the sugars and protein of non-fat dry milk have, in Alba shakes, been replaced with fibrous substances that add bulk but not calories. Though not intended as a meal substitute, it is intended to be a wholesome food product, and provides a significant amount of calcium and vitamin D. Alba™ shakes, and other low calorie snack products can be used a weight loss or weight maintenance diet aids.

"Fat Burners" fall into three categories: fibrous substances which immobilize fats, such as glucomannan; thermogenic agents which increase the metabolic rate and convert body fat to energy, such as L-Carnitine; and fat directors which inhibit lipogenesis (deposition of unburned fat), such as Chromium and the HCA from Garcinia Cambogia.

Lite Bites™ snack bars contain sugar, and the fat burners Chromium Pincolinate, Garcinia Cambogia (the extract from this plant is HCA or Hydroxycitrate), and L-Carnitine. They have 160 calories, and 30 g carbohydrate per bar, with 2 grams of fiber.

Lite Bites Classic™ snack bars are described on the internet as the lower fat, lower calorie bar, lacking the chocolate coating of Lite Bites. Lite Bites also sells a powdered shake mix, containing the three fat burners, Chromium Pincolinate, Garcinia Cambogia (also called HCA or Hydroxycitrate), and L-Carnitine.

Forever SliM™ capsules contain the same three fat burners as Lite Bites; however, the ingredients include cellulose, a bulking agent, and wild Mexican yam. The capsules are to be taken 3× a day, with 8 oz. of water, hopefully creating 8 ounces of stomach satiating bulk.

Berry Trim Plus® capsules contain herbs, vitamins and minerals, including the fat-burners L-Carnitine, Chromium Pincolinate, and CITRIN® (which may work as an HCA-type fat-burner). The capsules also include a minor amount of cellulose fiber, but not enough to be considered a bulking agent.

U.S. Pat. No. 6,048,532 claims a weight loss composition containing sugar and the combination of a fat burner (L-Carnitine) and the bulking agent glucomannan. There are a number of patents that disclose diet foods containing multiple fat burners, with or without sweeteners. U.S. Pat. No. 5,911,992 discloses a diet substance containing a thermogenic fat burner, and a fat burner that inhibits lipogenesis, with an herbal appetite suppressant.

Vitamin/mineral supplements, generally, are helpful additions to the everyday diet; however, most do not address the uncommon nutritional deficiencies that can result in weight gain. Mass market diet convenience foods have not dealt with this issue.

It is an object of the present invention to provide a wholesome food product or meal substitute, with low calories, low sugar, fiber, and nutritional supplementation. It is a further object of the present invention to provide a healthier, and more successful, diet plan and diet food product with broad nutritional supplementation, fat burners, and fiber.

SUMMARY OF THE INVENTION

The present invention comprises wholesome food products containing non-fat milk, at least one fat burner, and an artificial sweetener. When made into a shake drink they have about 110 calories per 12 ounces. When made into a pudding they may contain tetrasodium pyrophosphate. As a frozen dietary dessert they have less than about 20 calories per ounce, but still contain no added sugar; the additional calories coming almost exclusively from milk. By use of the milk and added nutrients, but no added sugar, the food products of the present invention have about one-half, or less, calories than the carbohydrate based commercial meal substitute diet foods. These products are ideally suited for use in a satiation weight loss or weight maintenance program. These wholesome food products also contain essential vitamins and minerals, and preferably, trace minerals.

The preferred weight loss or weight maintenance food products contain nonfat milk, at least two fat directors, at least one fat immobilizer, and an artificial sweetener, with no added sugar, and have about 110 calories per 12 ounces. More preferably, the fat immobilizer is glucomannan. The present invention also includes a weight loss or weight maintenance method based on a repletion and satiation food plan, comprising at least 3 meals a day, a number of very low calorie snacks, and at least 4 portions of the food products of the present invention.

DETAILED DESCRIPTION OF THE INVENTION

The food products of the present invention have many uses, which belie their seemingly simple, though unique, formula. As a weight loss or weight maintenance food product they provide good nutrition with vitamins, minerals, and milk sugar. In comparison with the standard diet/meal replacement drinks they have only one-half the calories, and no added sugar, to avoid fluctuations in blood sugar, yet permitting the user to have more food product drink portions per day.

The food products of the present invention are especially suited for a satiation diet plan. Within the bounds of the present invention is a diet plan calling for approximately 16 food (or snack) portions taken almost hourly throughout the (waking) day. The food product of the present invention may be included as 5 portions of the approximately 16 daily food (or snack) portions. Another 3–4 portions may be meals, with the remaining portions, snacks. Preferably, the snacks have less than about 20 calories, and most preferably, about 12 calories.

Low lactose levels in these food products keep blood sugar levels from spiking or plunging. The fiber contained in these food products increases the sense of satiation or fullness. The fibers, and especially the added fat burners in the food product, reduce the levels of absorption and deposition of fats ingested in, or resulting from, subsequent meals or snacks. The use of sucralose provides a sweetness (without added sugar) superior to the sweetness and flavor of other artificial sweeteners, (minus the side effects reported with some artificial sweeteners).

The particular combination of ingredients in the food products of the present invention may be used to lose weight or maintain weight. They can also be used in an appetite satiation diet to "train" the body from too much appetite before a meal. It can be used by those who wish, for diet or other medical reasons, to maintain a low fat intake Anecdotally, and unexpected, it has found use in reducing or eliminating ingestion of alcoholic beverages.

In a preferred embodiment of the present invention, the food product includes more than 50, and more preferably, more than 70 trace minerals. These nutrients act to maintain optimal health while consuming a carefully designed, and perhaps minimal, food plan. These trace minerals are also a great benefit to those persons who have actual (or body perceived) mineral deficiencies which, unsated, can produce cravings for otherwise unnecessary foods or substances. The inclusion of these trace minerals decreases the medical need to identify the precise mineral deficiency, and supplies the necessary supplementation, easily, in a wholesome food product.

Because the food products of the present invention have low sugar levels, vitamin and/or mineral supplementation, and fiber, they have particular use for medical/surgical patients. Use of the product before a medical or surgical procedure can both supplement the nutrition and establish consistent bowel function, without introducing excess sugar levels. Use of anesthesia in surgery often disturbs bowel function, with the regaining of function a factor in the speed of recovery. The food product of the present invention can be used, with or without prescription, to increase nutrition and body health before surgery, and to reestablish health following surgery. Other medical procedures and medications, or stress on the body can also effect bowel function. It is believed that the food product of the present invention will benefit patient health both before and after the procedure, medication, or stress.

Another low calorie, low sugar diet drink, Satietrol, is drunk 15 minutes before a meal. It is said to establish and maintain sufficient levels of a protein, cholecystokinin, which gives the body a sense of fullness. It also contains Konjak. It is not a nutritional supplement, or a meal substitute, and has too much fat and fiber to have much usefulness for medical/surgical patients.

The food product of the present invention is most commonly realized in a shake drink comprising non-milk, sucralose, and a fat burner, preferably from a list of fat burners, including the following: Pyruvate, Chromium Pincolinate, Garcinia Cambogia (the extract from this plant is HCA or Hydroxycitrate), Radiola-Rosea, L-Carnitine, and Glucomannan (also called mannan; the mucilage of aloe vera). Sucralose: is a potent sweetener originally disclosed in GB 1543167. It is an altered or chlorine substituted sugar molecule, with 600 times the sweetness of sugar. The true sugar taste of Sucralose is a vast improvement over the prior art artificial sweeteners. It is available from Tate & Lyle, and in the form of Splenda, from Johnson & Johnson. Nonfat milk contains 11 grams of carbohydrates, as lactose in each 8-oz. glass. The shake drinks of the present invention contain slightly more than the 11 g. of lactose, and fiber thickeners, for a 12-ounce food portion. Unexpectedly, an increase in lactose eliminates any perceived chlorine taste that may result from the inclusion of sucralose. It is not believed that reduced lactose products provide this advantage. By increasing the lactose the invention of the present application avoids use of commercial products such as Slim Energy which alters Sucralose's chlorine taste.

Glucomannan (from the konjak root) is a thickener in oriental cooking. It is currently being sold through Internet herb and nutrition stores as a bulking agent like other fibers. There are 318 patents referencing glucomannan, the majority of them describing its use as a thickener in industrial chemical processing.

The food products of the present invention also include vitamin and mineral supplementation. In addition, the food products preferably contains more than 70 trace minerals, to address the problem of over eating, or eating "unhealthy" amounts of food or other substances to obtain a particular mineral, for which the body senses a deficiency.

Another ingredient of the food product of the present invention is fiber, in the form of a mixture of gums. This ingredient provides thickness, or texture, and a sense of fullness upon eating the food product. It is also important that the textures not become too firm, and that the thickening or bulking agents be healthy, and not adversely affect the taste of the food product. A mixture of gums containing Xanthan, cellulose and carrageenan, has been found which provide ideal texture.

A sampling of variously flavored recipes follows. It is exemplary, not exhaustive, of the present invention. The weights of the ingredients are those per 12-ounce food portion. Though it is contemplated that the food products of the present invention be consumed as a liquid, it is within the scope of this invention that the food product be sold as both a drink, and a powder for mixing a drink or pudding. The precise weights and ratios set forth in the lists below are not necessary to achieve the objects of the present invention, they were considered most appropriate for manufacturing and processing (retorting) the liquid food product drink for tetrapak containers. Minor variations may be made for packaging a dry mix of the food products, or for canning the liquid form food products of the present invention, as known in the art. As known in the art, the pudding (or dry pudding mix) may contain tetrasodium pyrophosphate for enhanced thickness and texture.

| Ingredients | g./oz. |
|---|---|
| Chocolate Flavor | |
| Nonfat Milk Solids (heat stable) | 20.66 |
| Hershey Cocoa Powder | 4.5 |
| Ultrasmooth Gum: Xanthan, cellulose, carrageenan TIC | 2 |
| Salt (Diamond crystal Table salt) | 0.5 |
| Sucralose powder | .09 |
| BASF vitamin/mineral mix 556732 | 0.065 |
| vanilla flavor MX722, Flavor Sciences, Inc. | 0.03 |
| Garcinia Cambodia powder (Nutratech) | 0.075 |
| L-Carnitine tartrate (Nutratech) | 0.0625 |
| Glucomannan (Nutratech) | 0.0125 |
| Chromium w/70 Minerals (Thor) | 0.01 |

The above list of ingredients produces a drink food portion with about 94 calories per 12 ounces.

| Ingredients | g./oz. |
|---|---|
| Vanilla Flavor | |
| Nonfat Milk Solids (heat stable) | 24.615 |
| Ultrasmooth Gum: Xanthan, cellulose, carrageenan TIC | 2.0 |
| Salt (Diamond crystal Table salt) | 0.5 |
| Sucralose powder | .09 |
| BASE vitamin/mineral mix 556732 | 0.065 |
| vanilla powder flavor MX722, Flavor Sciences, Inc. | 0.07 |
| Garcinia Cambodia powder (Nutratech) | 0.075 |
| L-Carnitine tartrate (Nutratech) | 0.0625 |
| Glucomannan (Nutratech) | 0.0125 |
| Chromium w/70 Minerals (Thor) | 0.01 |
| mono + diglicerides (Cultor Food Sciences) | 0.5 |

The mono+diglicerides in the above recipe are incorporated for the standard use, as emulsifiers. The above list of ingredients produces a drink food portion with about 94 calories per 12 ounces.

| Ingredients | g./oz. |
|---|---|
| Coffee Flavor | |
| Nonfat Milk Solids (heat stable) | 23.855 |
| Ultrasmooth Gum: Xanthan, cellulose, carrageenan TIC | 2.0 |
| Salt (Diamond crystal Table salt) | 0.5 |
| Sucralose powder | .07 |
| BASF vitamin/mineral mix 556732 | 0.065 |
| Taster's Choise (granules) | 1.35 |
| Garcinia Cambodia powder (Nutratech) | 0.075 |
| L-Carnitine tartrate (Nutratech) | 0.0625 |
| Glucomannan (Nutratech) | 0.0125 |
| Chromium w/70 Minerals (Thor) | 0.01 |
| Raspberry Flavor | |
| Nonfat Milk Solids (heat stable) | 24.63 |
| Ultrasmooth Gum: Xanthan, cellulose, carrageenan TIC | 2.0 |
| Salt (Diamond crystal Table salt) | 0.5 |
| Sucralose powder | .09 |
| BASF vitamin/mineral mix 556732 | 0.065 |
| Artificial raspberry flavor MX741, Flavor Sciences, Inc. | 0.04 |
| Red Color powder #40 | 0.0142 |
| Gardenia Cambogia powder (Nutratech) | 0.075 |
| L-Carnitine tartrate (Nutratech) | 0.0625 |
| Glucomannan (Nutratech) | 0.0125 |
| Chromium w/70 Minerals (Thor) | 0.01 |
| Blue Color #1 (Flavor Sciences,Inc.) | 0.001 |
| mono + diglicerides (Cultor Food Science) | 0.5 |

The liquid food products of the present invention may be packaged in e.g., tetrapaks, cartons or cans. Products packaged in tetrapaks generally have a shelf-life of more than 6 months, and cans even longer. When packaged in the traditional "milk carton, the liquid food products of the present invention require refrigeration.

Use of the above described prior art capsules, bars or shakes, is limited to 3/day. The capsules or shakes represent 8 oz. of liquid intake. The satiation Diet Plan of the present invention has, ideally, 16 portions a day, consisting of 4 drink treats (110 cal.), along with 8 low calorie snacks, and three meals, which in combination produces satiation. The portions are taken at approximately one-hour intervals, to contain the appetite, and, hopefully, begin to produce an aversion to ingesting food. There is no particular order to the portions, but the meals should be somewhat spaced throughout the day, if possible.

The shakes of the present invention are ideal drink treats. They have 16 grams of carbohydrate from their milk base. In contrast, V8 has 50 calories, 8 grams of sugar, and 1.5 grams of fiber per 8 oz, serving, but no fat busters. The puddings of the present invention are also ideal treats. The invention of the present application includes both a low carbohydrate, and low sugar shakes and puddings, which combine fat burners and sucralose, and the use of the treat in a satiation diet plan.

In another embodiment of the present invention, the treat mix may be altered, by adding more milk solids, to make an extremely low calorie, extremely healthy "ice cream" substitute, or frozen dietary dessert, having as little as 12 calories per ounce. The frozen dietary dessert of the present application may be made in many flavors and include many flavor ingredients. In addition, it may also include some of the following ingredients used in commercial frozen desserts: eggs whites, glycerin, locust bean, pectin, carob bean, tragacanth, alcohol, salatrim and other similar ingredients.

Other uses for the food products of the present invention can be easily imagined. A single serving of Edy's No sugar added ice cream, at 80 calories, when added to a shake, provides a very large, outrageously thick and sweet milk shake at about 200 calories. Such a shake makes it easy to stick to only one serving of ice cream. Similarly, very low carbohydrate drinks, such as Crystal Light can be used to make the shake, when the need for sweet overwhelms. One can imagine the use of less than 12 ounces of liquid to make a sauce. Use of coffee or, e.g. green tea as the liquid to make the shake introduces interesting alternatives without stocking the larder with high calorie, high sugar, or high fat foods.

Though the invention of the present application has been described in relation to particular ingredients and processes it should be understood that the invention is not limited thereby. Obvious variations in ingredients, processes, diet plans, etc. known to those of skill in the art are included in this description, which is limited only by the following claims

We claim:

1. A wholesome food product, said product comprising non- fat milk, glucomannan as a fat immobilzier, and an artificial sweetener with no added sugar, said product having about 110 calories per 12 ounces.

2. A weight loss or weight maintenance food product comprising he wholesome food product of claim 1, further comprising essential vitamins and minerals, and fiber.

3. A weight loss or weight maintenance food product as in claim 2, further comprising trace minerals.

4. A weight loss or weight maintenance method comprising a repletion and satiation food plan, comprising administering to an individual, three meals and at 4 least treats per day comprising a food product as in claim 2.

5. A weight loss or weight maintenance method comprising a repletion and satiation food plan, comprising administering to an individual, three meals and at 4 least treats per day comprising a food product as in claim 3.

6. A weight loss or weight maintenance food product as in claim 1, further comprising fat burners selected from the group consisting of L-Carnitine, Garcinia Cambogia, Chromium Pincolinate, Radiola Rosea, Pyruvate, Green Tea Extract, and Chitosan.

7. A weight loss or weight maintenance method comprising a repletion and satiation food plan, comprising administering to an individual, three meals and at least 4 treats per day comprising a food product as in claim 6.

8. A weight loss or weight maintenance food product comprising the wholesome food product of claim 1, further comprises Chitosan as a fat immobilizer.

9. A weight loss or weight maintenance method comprising a repletion and satiation food plan, comprising administering to an individual, three meals and at 4 least treats per day comprising a food product as in claim 1.

10. The food product as in claim 1, further comprising at least one thermogenic agent which increases metabolic rate.

11. A weight loss or weight maintenance method comprising a repletion and satiation food plan, comprising administering to an individual, three meals and at least 2 treats per day comprising a food product of claim 10.

12. The food product as in claim 1, further comprising at least one fat director which inhibits lipogenesis.

13. A weight loss or weight maintenance food product as in claim 12, wherein at least one of the fat directors converts stored fat into energy.

14. A weight loss or weight maintenance food product as in claim 12, wherein at least one of the fat directors stores protein properly, in order to burn greater quantities of fat.

15. A weight loss or weight maintenance food product as in claim 12, wherein at least one of the fat directors inhibits lipogenesis.

16. A weight loss or weight maintenance method comprising a repletion and satiation food plan, comprising administering to an individual, three meals and at least 4 treats per day comprising a food product as in claim 12.

17. The food product as in claim 12, further comprising at least one thermogenic agent which increases metabolic rate.

18. A weight loss or weight maintenance food product comprising a wholesome food product, said product comprising non-fat milk, at least one fat burner selected from the group consisting of fibrous substances which immobilize fat, thermogenic agents which increase metabolic rate, and fat directors which inhibit lipogenesis, and an artificial sweetener, said product having about 110 calories per 12 ounces, and further comprising tetrasodium pyrophosphate.

19. A weight loss or weight maintenance method comprising a repletion and satiation food plan, comprising three meals and at least 4 treats per day comprising a food product as in claim 18.

20. A wholesome food product, said product comprising non-fat milk, at least one fat burner selected from the group consisting of fibrous substances which immobilize fat, thermogenic agents which increase metabolic rate, and fat directors which inhibit lipogenesis, and sucralose, said product having about 110 calories per 12 ounces.

21. A weight loss or weight maintenance method comprising a repletion and satiation food plan, comprising three meals and at least 4 treats per day comprising a food product as in claim 20.

22. A frozen dietary dessert, said dessert comprising non-fat milk, at least one fat burner, and sucralose, and having less than about 20 calories per ounce.

23. The frozen dietary dessert recited in claim 22, wherein the fat burner is a fat immobilizer.

24. The frozen dietary dessert recited in claim 23, wherein the fat immobilizer is Glucomannan.

25. The frozen dietary dessert recited in claim 22, wherein the fat burners are selectedfrom the group of L-Carnitine, Garcinia Cambogia, Chrominum Pincolinate, Radiola Rosea, Pyruvate, Green Tea Extract, Glucomannan and Chitosan.

* * * * *